United States Patent [19]
Chien

[11] Patent Number: 6,079,882
[45] Date of Patent: Jun. 27, 2000

[54] OPTICAL COMBINER FOR REDUNDANT OPTICAL PATHS IN SEISMIC DATA TRANSMISSION

[75] Inventor: Loring C. Chien, Katy, Tex.

[73] Assignee: Syntron, Inc., Houston, Tex.

[21] Appl. No.: 09/132,346

[22] Filed: Aug. 12, 1998

[51] Int. Cl.[7] .................................................... G02B 6/36
[52] U.S. Cl. .............................. 385/88; 385/89; 385/92; 385/24
[58] Field of Search ...................... 359/109, 127, 359/173, 159; 385/24, 88, 89, 92

[56] References Cited

U.S. PATENT DOCUMENTS 4,772,081  9/1988  Borgos et al. .............................. 385/89
5,050,953  9/1991  Anderson et al. ......................... 385/89

*Primary Examiner*—Hung N. Ngo
*Attorney, Agent, or Firm*—Felsman, Bradley, Vaden, Gunter & Dillon, LLP

[57] ABSTRACT

A connector for fiber optics provides a means for eliminating a receiver in a redundant communications channel. The connector receives at least two optical fibers in side-by-side contact and positions the optical fibers in close proximity but not abutting contact with a photo detector imbedded in the connector. The connector further provides a method and a system for redundant data communications.

11 Claims, 5 Drawing Sheets

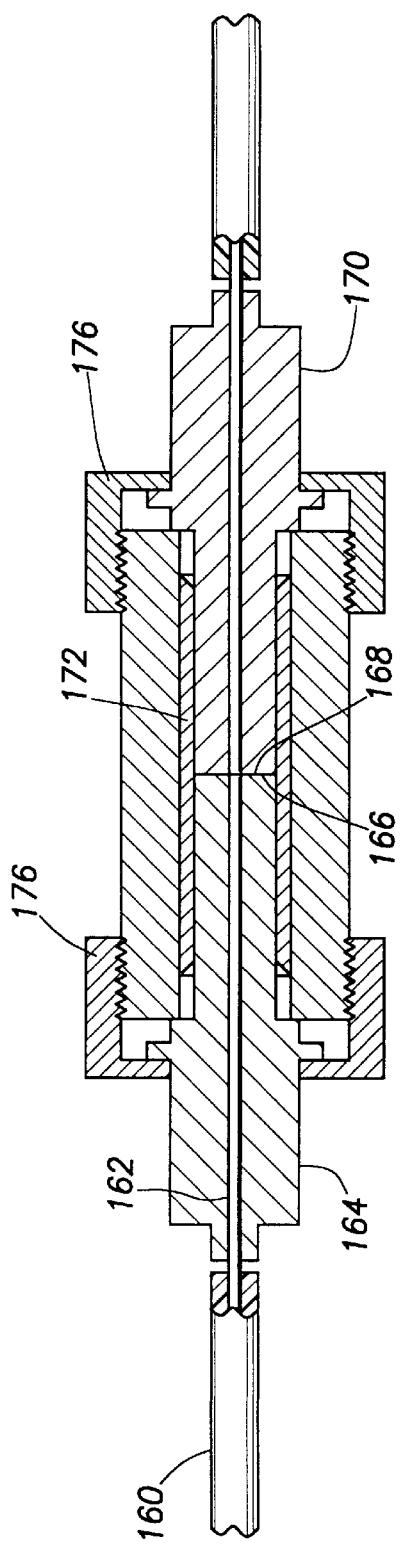
FIG. 2 (PRIOR ART)
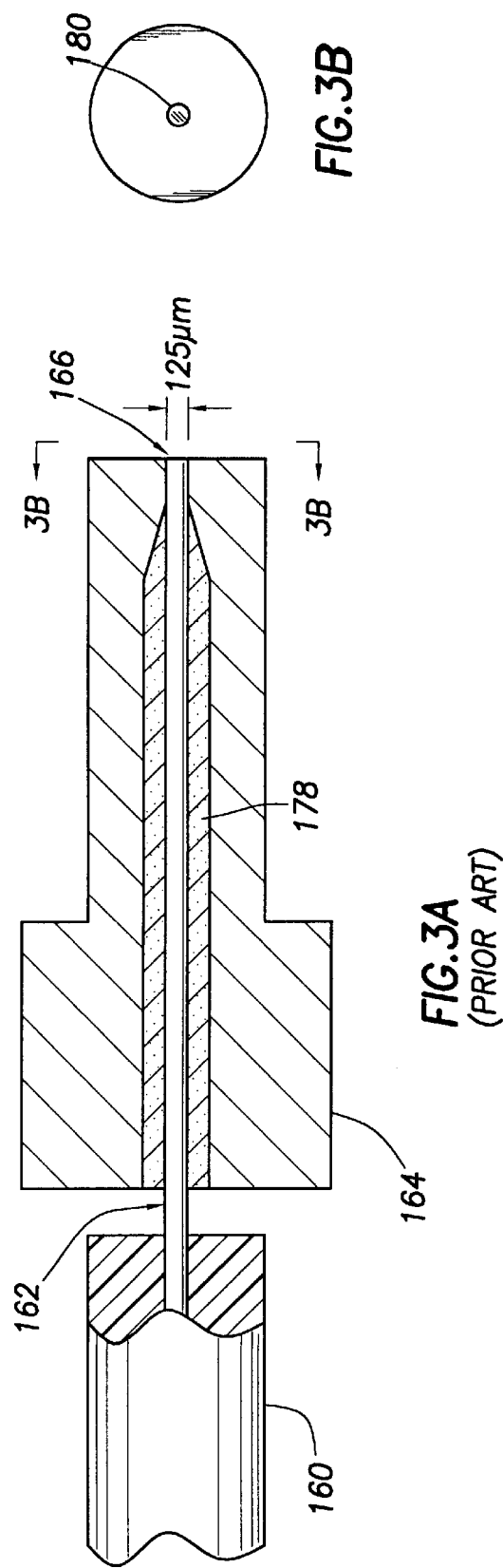
FIG. 3A (PRIOR ART)
FIG. 3B

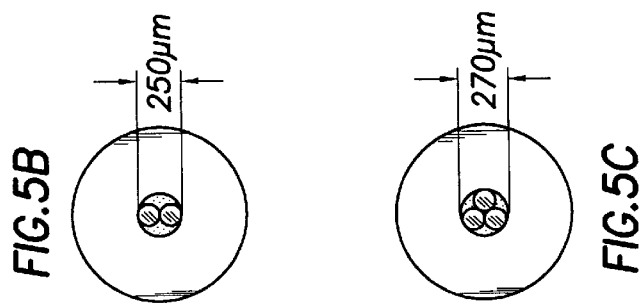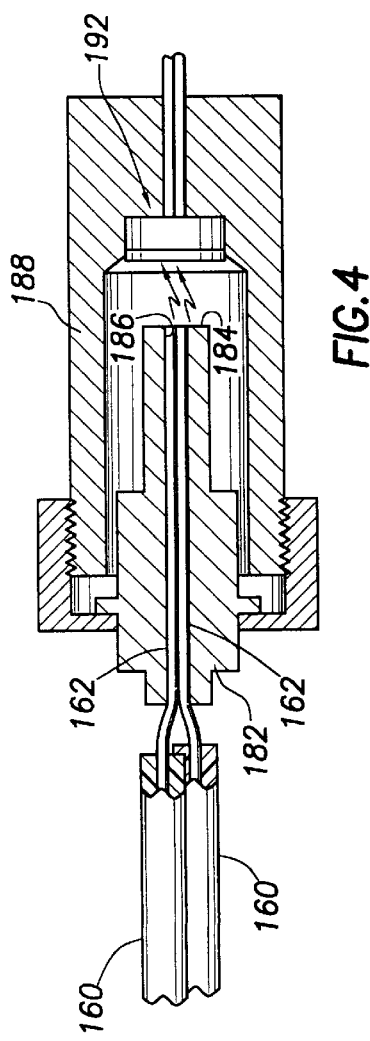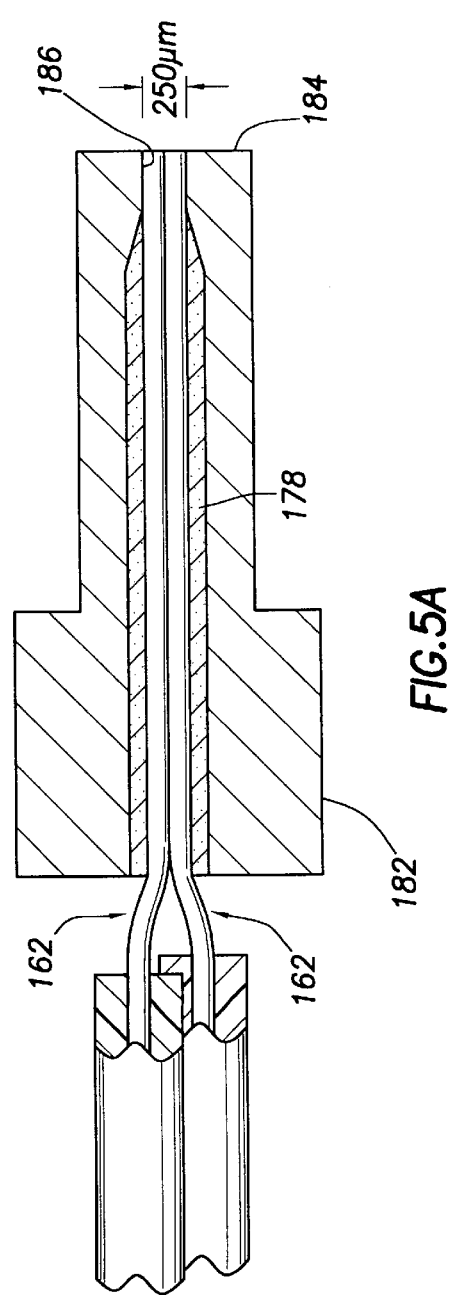

OPTICAL COMBINER FOR REDUNDANT OPTICAL PATHS IN SEISMIC DATA TRANSMISSION

FIELD OF THE INVENTION

The present invention relates generally to the field of optical data transmission and, more particularly, to a method and device enabling redundant optical data transmission paths in a seismic acquisition system.

BACKGROUND OF THE INVENTION

Seismic exploration for oil and gas commonly involves towing a marine seismic streamer cable behind a towing vessel. Acoustic signals are set off in the water, and return signals as seismic data are acquired by acoustic sensors in the cable. A seismic acquisition system of the telemetry type includes electronic acquisition units (AUs) between and joining cable sections. The AUs acquire the seismic data and telemeter it to a central recorder. Each AU generally has an outbound command path and an inbound data path.

In systems deployed in typical field applications, the cables are often subject to stress and damage due to handling, cuts, scrapes, damages by animal life, pinching, and crushing because of their length and deployment.

It is therefore desirable to have redundant telemetry elements between AUs to increase the likelihood that a system will be intact and operational after being deployed into the water behind the towing vessel.

Many systems use optical fiber for the telemetry path. With an optical fiber, the most common redundant system has two optical transmitters firing into two fiber paths and two independent receivers. AU design is sensitive to both cost, size, and electrical power consumption. Since optical receivers are the largest and most power hungry portions of the AU telemetry system, it is desirable to minimize the number of additional optical receivers.

A fiber fails by either a complete loss of signal due to a break, or severe attenuation of the telemetry signal resulting in a signal strength that is below the sensitivity of the receiver. Unlike electrical paths, optical paths do not get noisy, have crosstalk, or get "shorted".

The problem of system malfunction due to conductor or fiber damage has existed as long as seismic systems, although redundancy of system components became practical in the 1970's when telemetry-based seismic systems were first introduced. Truly redundant fibers and conductors are expensive and found in very few systems because of the cost and complexity of duplicating and allocating high-bandwidth. In other words, duplicating high bandwidth circuits and transmission paths is expensive, and using lower bandwidth paths requires more of such telemetry paths for the same data throughput. Generally, two transmitters, two data paths, and two receivers plus voting/selection circuitry is required for redundancy. The material, physical space, cost, and power consumption are disadvantages of including any such redundancy in a telemetry system.

There are no known redundant fiber seismic acquisition systems in the market today. Currently, cables with failed optical fibers require replacement of the damaged cable sections at a great cost in repair time, effort, and lost productivity.

The present invention provides a low cost system of redundant optical fiber data path backup, using minimal space, power, and cost. Although two transmitters, and two data paths are required, only one receiver, a costly and power-hungry part of an optical telemetry system, is required. Coupling of the data-carrying laser light is accomplished using a device known in the optical fiber art as a coupler, or by means described below in greater detail, thereby coupling multiple fibers into a single connector. Typical optical loss penalty is 3 dB (50%) using a coupler, versus about 0.4 dB (10%) for the present invention.

SUMMARY OF THE INVENTION

The present invention addresses these and other drawbacks of the prior art by providing an optical data system with redundant transmitters and data conductors, and by coupling the data signal into a common receiver of the system.

One aspect of the invention comprises coupling two fibers into one fiber at the receiver using what is commonly called a 2×2 optical coupler. A primary transmitter is normally driven and, if the signal is not acceptable at the receiver, the primary transmitter is switched off and a secondary transmitter is driven, utilizing the other fiber path. Since the primary transmitter path is not driven, no noise or extraneous signal is coupled into the primary fiber. The coupler makes the second receiver unnecessary, saving the cost, space, and power of such a redundant receiver.

The drawbacks of such an arrangement, i.e. the cost of the coupler, the space taken up by the coupler, and a 3 dB (50%) loss of signal resulting from coupling two fibers into one, are generally outweighed by the advantages of the redundancies provided by this invention. The preferred embodiment of the invention calls for coupling two or more fibers into one receiver using modified standard optical connector technology. This eliminates the loss associated with couplers, as well as the size and cost.

These and other features of the present invention will be apparent to those of skill in the art from a review of the following detailed description along with the accompanying drawings.

BRIEF DESCRIPTION OF THE DRAWINGS

FIG. 2 illustrates a typical butt connection: ST connector mated to another ST connector.

FIG. 3 illustrates the detail of an ST connector termination. A jacketed fiber is stripped of the jacket on the termination end. The bare end of the fiber is inserted into the bored-out center guide FIG. 4 illustrates how the ST type connector is coupled to the oversized detector element of an optical receiver.

FIG. 5 illustrates the invention of the combining connector, in which two or more fibers are closely held and epoxied in an over-bored ST connector ferrule pin such that the fibers will couple light onto an oversized detector, and shown in FIG. 4.

DETAILED DESCRIPTION OF A PREFERRED EMBODIMENT

Figure 1A:
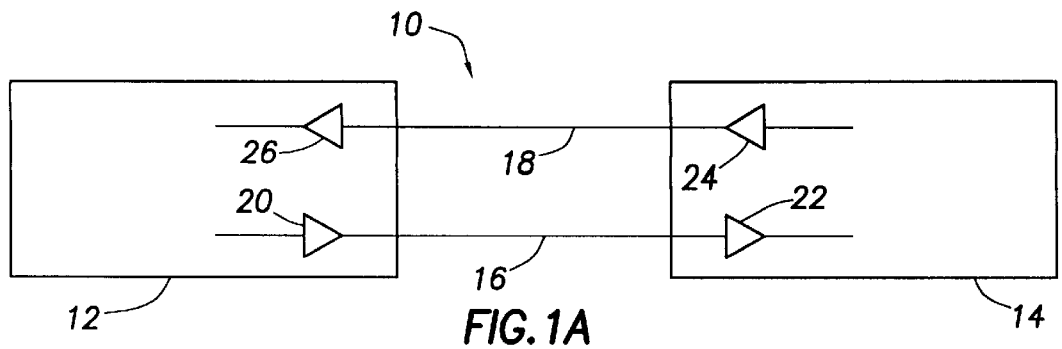
FIG. 1A depicts a known data telemetry system with non-redundant telemetry paths.

FIGS. 1A through 1D depict various data telemetry systems. FIG. 1A shows a known system 10 with no redundant components. The system includes an AU or module 12 and a module 14, coupled by an outgoing data path 16 and an incoming data path 18. A transmitter 20 in the module 12 sends data, generally a command signal, over the data path 16 to a receiver 22. Similarly, a transmitter 24 in the module 14 sends data, generally seismic data, over the data path 18 to a receiver 26. Since this known system includes no redundant components, failure of any components results in failure of the whole system.

Figure 1B:
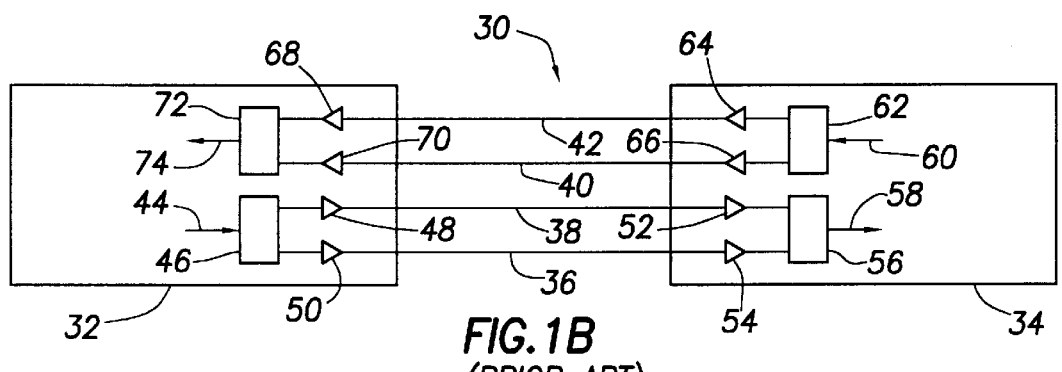
FIG. 1B depicts a known data telemetry system with fully redundant telemetry paths, i.e., redundant transmitters, receivers, and data paths.

FIG. 1B shows another known system 30 with full redundancy. The system includes an AU or module 32 and a module 34, coupled by redundant outgoing data paths 36 and 38 by redundant incoming data paths 40 and 42. An outgoing message line 44 feeds a selector 46, which provides the capability of selecting between a primary transmitter 48 and a secondary transmitter 50. The selected transmitter 48 or 50 sends data, generally a command signal, over its associated data path 38 or 36 to a primary receiver 52 or a secondary receiver 54, respectively. The primary receiver 52 and the secondary receiver 54 are coupled to an arbitrator 56, which responds to whichever receiver is receiving data, and provides an output on a command line 58.

Similarly, an incoming message line 60 feeds a selector 62, which provides the capability of selecting between a primary transmitter 64 and a secondary transmitter 66. The selected transmitter 64 or 66 sends data, generally seismic data, over its associated data path 42 or 40 to a primary receiver 68 or a secondary receiver 70, respectively. The primary receiver 68 and the secondary receiver 70 are coupled to an arbitrator 72, which responds to whichever receiver is receiving data, and provides an output on an incoming data line 74.

Figure 1C:
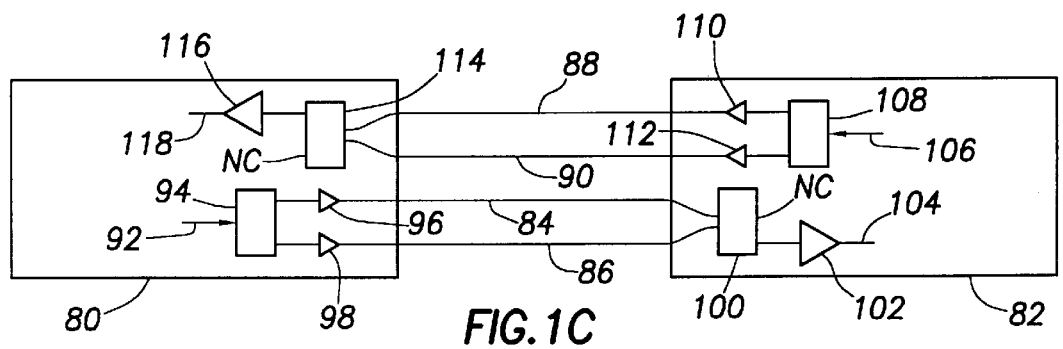
FIG. 1C depicts the invention with redundant data paths and transmitters, but a single receiver at each end, using a coupler.

FIG. 1C depicts a preferred embodiment of this invention. The system of FIG. 1C includes an AU or module 80 and a module 82, coupled by redundant outgoing data paths 84 and 86 and by redundant incoming data paths 88 and 90. An outgoing message line 92 feeds a selector 94, which provides the capability of selecting between a primary transmitter 96 and a secondary transmitter 98. The selected transmitter 96 or 98 sends data, generally a command signal, over its associated data path 84 or 86 to an optical coupler 100, which combines the signals on the data lines 84 and 86, thereby providing a combined signal to a receiver 102 which provides an output on a command line 104.

Figure 1D:
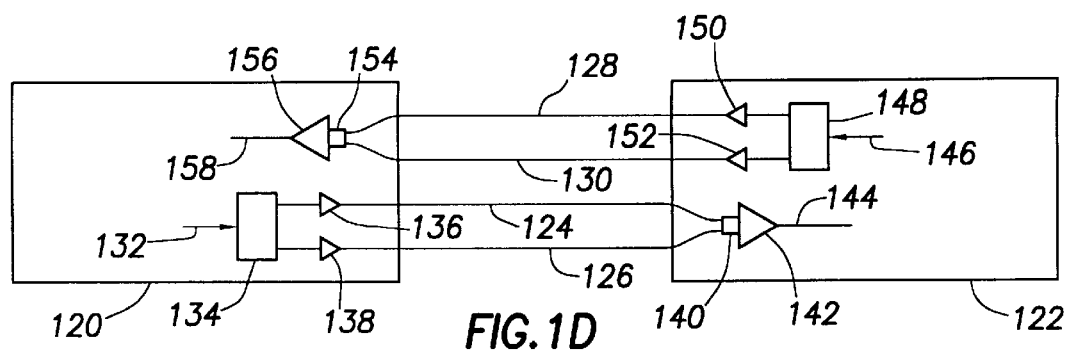
FIG. 1D depicts the invention with redundant data paths and transmitter, and further including combiner connectors replacing the optical coupler of FIG. 1C.

Similarly, an incoming message line 106 feeds a selector 108, which provides the capability of selecting between a primary transmitter 110 and a secondary transmitter 112. The selected transmitter 110 or 112 sends data, generally seismic data, over its associated data path 88 or 90 to an optical coupler 114, which combines the signals on the data lines 88 and 90, thereby providing a combined signal to a receiver 116 which provides an output on a data line 118. Note that this structure has eliminated a receiver in each of the modules 80 and 82, while still providing redundant data channels FIG. 1D depicts another preferred embodiment of this invention. The system of FIG. 1D includes an AU or module 120 and a module 122, coupled by redundant outgoing data paths 124 and 126 and by redundant incoming data paths 128 and 130. An outgoing message line 132 feeds a selector 134, which provides the capability of selecting between a primary transmitter 136 and a secondary transmitter 138. The selected transmitter 136 or 138 sends data, generally a command signal, over its associated data path 124 or 126 to a combiner connector 140, which combines the signals on the data lines 124 and 126, thereby providing a combined signal to a receiver 142 which provides an output on a command line 144.

Similarly, an incoming message line 146 feeds a selector 148, which provides the capability of selecting between a primary transmitter 150 and a secondary transmitter 152. The selected transmitter 150 or 152 sends data, generally seismic data, over its associated data path 128 or 130 to a combiner connector 154, which combines the signals on the data lines 128 and 130, thereby providing a combined signal to a receiver 156 which provides an output on a data line 158. Note that this structure has eliminated the coupler of the structure of FIG. 1C.

In one aspect, the present invention relates to the connectors 140 and 154 for optical fibers. In fiber optics, a butt-type connector such as a metal ST connector (for example, made by Amphenol and others) is usually used to terminate one fiber into the center of a precision bored metal ferrule pin using cleaved fibers and epoxy glue to secure the end of the bare fiber into the bore. The fiber tip protruding from the mating end of the ferrule pine is then polished. In the standard method of optical termination, the bore at the tip tapers to 125 $\mu$m diameter to hold a 125 $\mu$m fiber with a 62.5 $\mu$m core ("62/125" fiber). The polished end, in a receiver, is centered over, but not in contact with, the photodetector portion that is quite a bit larger in diameter than the 62 $\mu$m glass core which conducts the laser light. These optical receivers are well known in the art and are made by Honeywell, Mitel, and others.

FIG. 2 depicts a known ST fiber optic connector. A jacketed fiber optic 160 has a portion of jacketing removed to expose a bare fiber 162, which is bonded into an ST ferrule pin 164 as previously described. The ferrule pin 164 terminates in a tip 166 which is precisely mated to a tip 168 of a ferrule pin 170. The pins 164 and 170 are held in precise alignment by an alignment sleeve 172 into which the pins are inserted. The pins are also held in close abutting contact by a coupling, which comprises a coupling tube 174 threadedly engaged with a pair of coupling nuts 176.

FIGS. 3A and 3B provide further details of known ST connector of FIG. 2. The un-jacketed fiber filament 162 is inserted into the pin 164 and glued into place with epoxy 178. After the fiber is inserted, the tip 166 of the pin is polished to leave a precision surface at the tip with the fiber exposed. As shown in FIG. 3B, the tip has a circular cross section with a circular orifice 180 for the fiber and the orifice is preferably 125 $\mu$m is diameter in this known connector.

The connector of the preferred embodiment of the present invention has an overbored or enlarged ferrule pin, such that the opening for the fiber at the tip is twice the size, i.e. 250 $\mu$m, to hold two fibers side by side, and the bore is concentric with the pin.

Another embodiment is bored to 270 $\mu$m and holds three fibers (for triple redundancy). More fibers can be added, but with a larger bore, the fibers become further away from the center of the pin and a reduction in the light reaching the central, sensitive portion of the receiver occurs yielding greater optical signal losses. In the two fiber embodiment, the bare fibers are glued side by side and the tip of the pin is polished in a manner so that the two fiber tips are polished.

Because the bore is close fitting, the fibers are close enough in parallel so that losses are minimal. The resulting signal, when coupled to a receiver, in tests, showed to be 0.44 dB less for either fiber driven than the performance of a single fiber terminated in a conventional ST connector. This is because the two fibers still are positioned over the central sensing area of the photodetector.

This aspect of the present invention is depicted in FIG. 4. A pair of jacketed fiber optics 160 has bare fibers 162 exposed and inserted into the modified ferrule pin 182. As just described, the ferrule pin 182 terminates in a tip 184 which has a larger than standard bore 186 to hold the fibers in close abutting, side-by-side configuration. The ferrule pin 182 is inserted into a photo receiver unit body 188 and held in alignment with a coupling nut 190 engaged to the body 188, by any of a variety of couplings, such as threads, bayonet, etc. The tip 184 of the ferrule pin is positioned close to but not abutting an embedded photo detector 192 to receive light equally from either of the fibers 162.

FIGS. 5A–5C provide additional details of the ferrule pin 182. The un-jacketed fiber optics 162 are inserted into the pin 182 and glued into place with epoxy 178. After the fiber optics are inserted, the tip 184 of the pin is polished to leave a precision surface at the tip with the fibers exposed. As shown in FIG. 5B, the tip has a circular cross section with a circular orifice or bore 186 for the fiber and the orifice is preferably 250 $\mu$m in diameter in this connector of the present invention. For triple redundancy, the bore may be 270 $\mu$m in diameter to accommodate three fibers, as shown in FIG. 5C.

Figure 6:
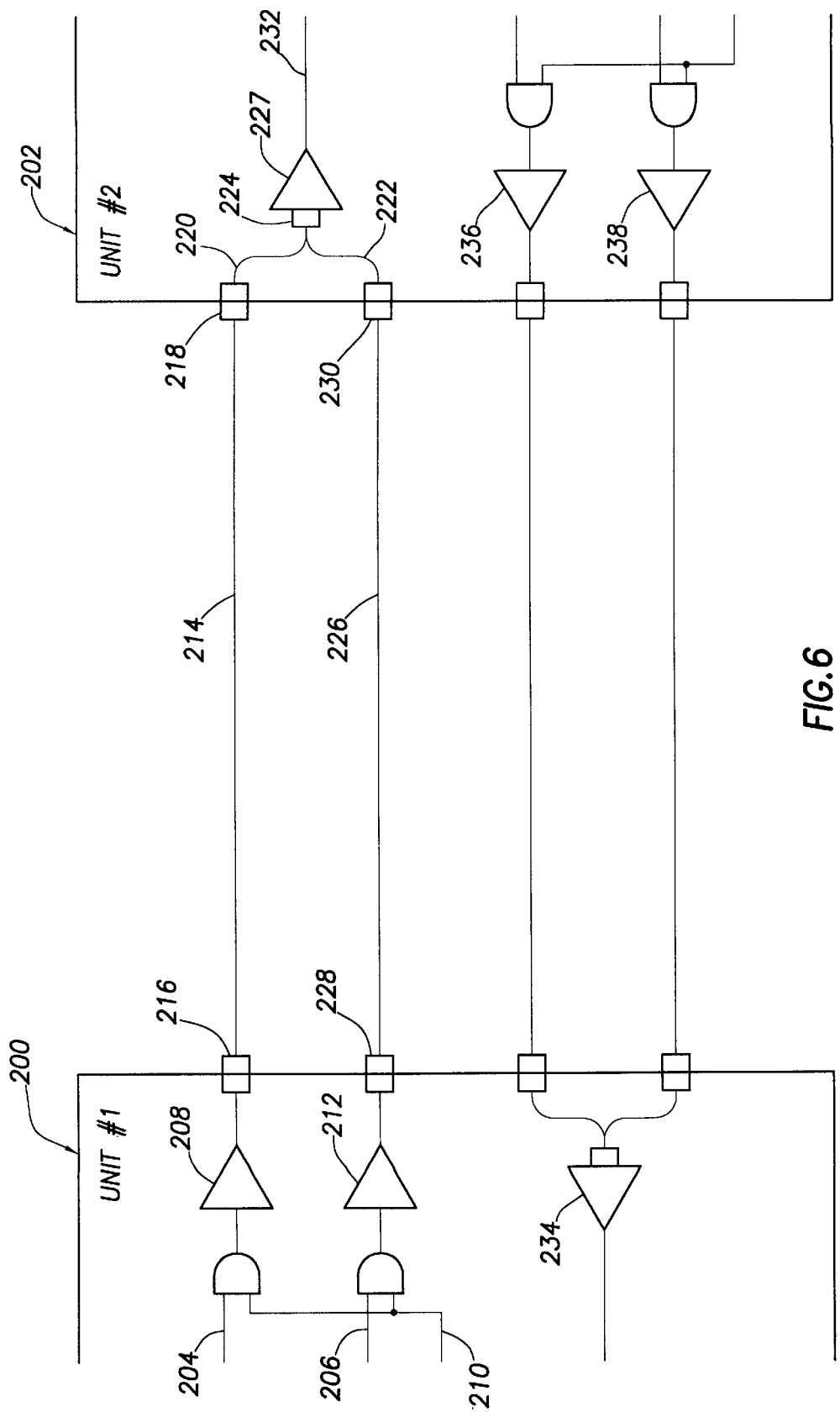
FIG. 6 is an enumerated detail of the preferred embodiment showing primary and alternate data paths in a bidirectional data system arrangement.

FIG. 6 depicts a preferred embodiment of the digital optical telemetry system of this invention in greater detail. Data in a digital system comprise ones and zeros; zeros are represented by no light (dark) output, and ones are represented by a light output. In normal operation, a unit 200 sends digital data to a unit 202. To select the primary transmitter, a primary transmitter selector input 204 is high and alternate transmitter selector input 206 is low. Thus, a primary optical transmitter 208 outputs light pulses following data input 210 and an alternate data transmitter 212 is off, with optically dark output. The signal from the primary transmitter 208 is carried over prime optical fiber 214 using conventional ST connectors 216 and 218. Fiber jumpers 220 and 222 are connected to combiner connector 224 as shown in FIG. 4, thus conducting light pulses from the prime optical fiber 214 and no signal from a backup fiber 226. A receiver 227 converts the light impulses from the connector 224 to electrical signals similar to those at the data input 210.

In the event of failure of the prime optical fiber 214, connector 216 or connector 218, or even transmitter 208, only a dark optical signal will reach the connector 224 since the nature of the fiber optic is to reject coupling any outside light into the fiber except what can be coupled into the very small aperture of the break point which is usually jacketed in multiple jackets and out of the way where there is little if any light, such as in marine streamers. If the unit 202 detects loss of signal or degradation of the optical signal, it directs the signal unit 200 to switch to the alternate data path. This is accomplished by setting the primary transmitter input selector 204 low and the alternate input selector 206 high, thus steering the signal to the secondary transmitter 212. Light impulses will now emit from the transmitter 212 and be transmitted over alternate fiber path 226 through connectors 228,230, and fiber jumper 222. Fiber combining connector 224 combines the signals from 220 and 222 in an additive fashion and delivers them to the photodetector element of the receiver 227.

In the case of using the alternate data path 226, the path 220 is dark due to failure of the primary fiber 214, the connector 216, the connector 218, or the primary transmitter 208. In any case, the primary transmitter 208 will be shut off by signal 204 being low. The signal in the fiber 220 will be substantially zero and the combiner connector 224 will deliver substantially the signal in fiber 222 to the photodetector in the receiver 227. Therefore, a signal 232 recovered by the receiver 227 will be substantially the same as signal 210. This is similar to the normal mode of operation result described before the failure; however, the alternate fiber 226 and the alternate transmitter 212 are now used instead of the primary transmitter 208 and the prime optical fiber 214.

The data path in the opposite direction utilizing receiver a 234 and transmitters 236 and 238 operates in the same fashion.

Figure 7:
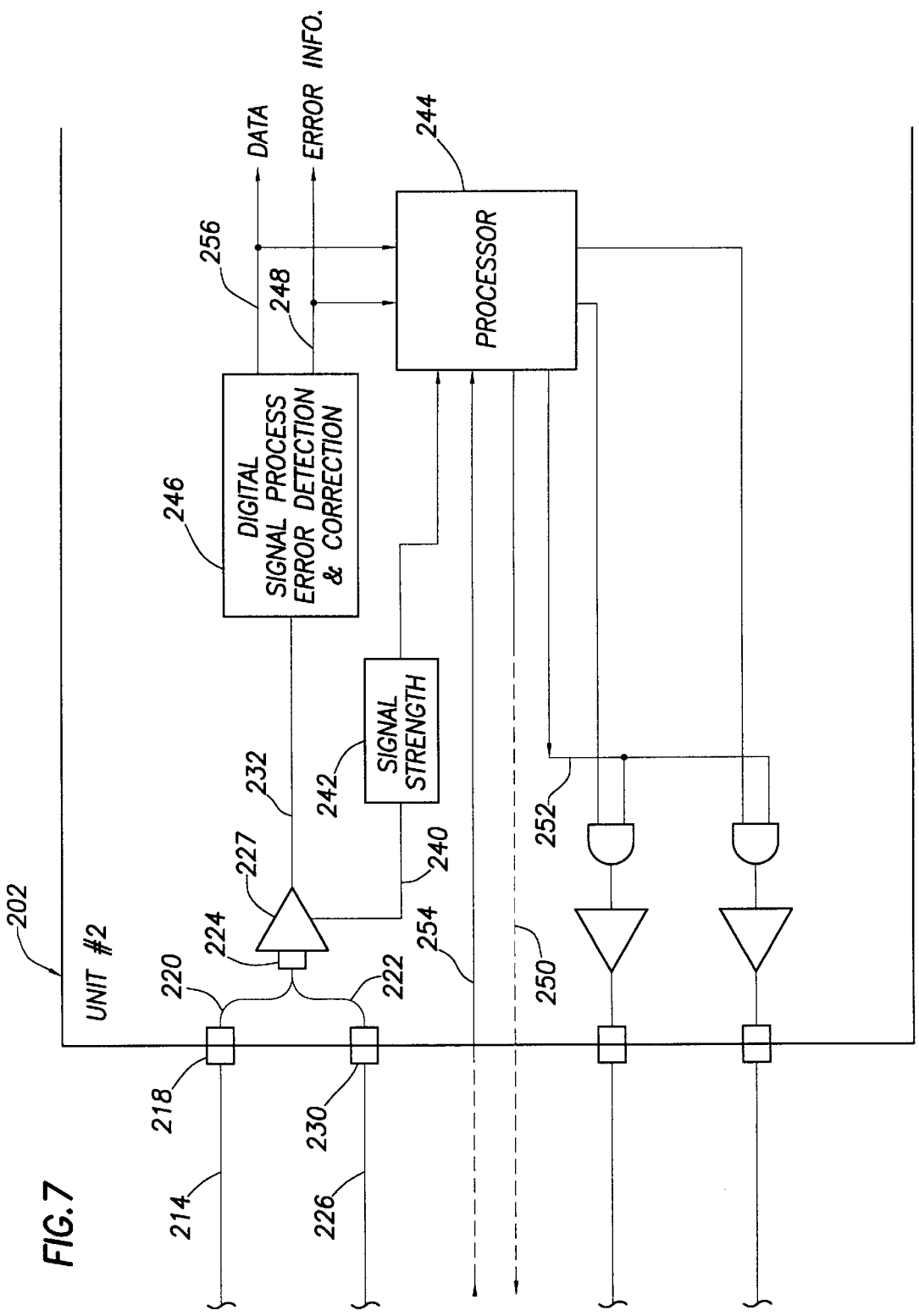
FIG. 7 is an enumerated detail of the preferred embodiment showing determination means for selecting transmitter.

Now referring to FIG. 7, it is desirable to determine when to switch to the alternate transmitter and fiber path. One way to do this is to conduct a signal analogous to the received optical power signal strength at the receiver 227 through a conductor 240 to signal strength circuit 242. Some receivers have this feature, such as receivers from CTS, Inc. The signal strength circuit 242 may consist of rectifiers, amplifiers, peak detectors and A/D converters as necessary to get the signal level indication to processor a 244. Alternately or in combination, the incoming signal 232 may be processed for error indication (parity, CRC, or other source embedded data symbols for error detection and correction, or EDC) by EDC circuits 246. The processor 244 reads the error information from the EDC circuits 246 through an error info line 248. The processor 244 may be programmed to determine by means of a suitable algorithm from signal level information and error information when the incoming signal is unsuitable and by means of a connection 250 to unit 200 (FIG. 6). cause unit 200 to change to the alternate transmitter. Alternatively, the processor 244 can signal unit 200 by means of data embedded in the data stream 252 to be transmitted back to the unit 200 by the means previously described. The processor 244, operating like a similar one in unit 200, can select which transmitter to use by listening to a connection 254 from unit 200 (analogous to the connection 250 described above), or by listening to information embedded in the data recovered at a data signal line 256. Finally, in the case of bidirectional units as described, if no valid data is found from unit 200, an alternating search may be made through as many redundant transmitters as are available, until one working transmitter is found that will cause unit 200 to send information which confirms that a signal is received.

There are many types of connectors used for optics, many with butt-type polished ends in metal or ceramic, for example. Any type of connector which allows the light exiting the fibers to strike the photosensitive portion of the receiver are appropriate for application with the present invention and fall within the scope and spirit of the following claims. Also, fibers other than the 62/125 $\mu$m described may be used, the common sizes still being smaller than the detector size.

Seismic systems commonly use bidirectional data paths, the outgoing path containing commands from a central unit, the incoming data paths carrying seismic data to the central unit. However, the invention as described herein is equally applicable in unidirectional data systems carrying data one way, nor is the invention restricted to seismic systems. Furthermore, driving two or more parallel transmitter and data paths may be desirable if multi-path data dispersion is not a problem, wherein the differential time delays due to unequal path lengths or delays cause a smearing of data pulses.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A communications channel comprising:
   a. an outgoing data line to carry an outgoing data signal for transmission over the communications channel;
   b. a selector coupled to the outgoing data line;
   c. a primary transmitter coupled to the selector;
   d. a secondary transmitter coupled to the selector, wherein the selector is capable of selecting either the primary transmitter or the secondary transmitter;
   e. a primary data transmission path coupled to the primary transmitter;
   f. a secondary data transmission path coupled to the secondary transmitter;
   g. an adder coupled to the primary and secondary data transmission paths, the adder providing a sum of signals carried on the primary and the secondary data transmission paths;
   h. a receiver coupled to the adder; and
   i. a data output from the receiver.

2. The communications channel of claim 1, wherein each of the primary data transmission path and the secondary data transmission path is an optical fiber.

3. The communications channel of claim 2, wherein the adder is an optical coupler.

4. The communications channel of claim 1, wherein the selector comprises:
   a. a primary selector AND gate coupled to an input to the primary transmitter;
   b. a secondary selector AND gate coupled to an input to the secondary transmitter;
   c. a primary transmitter selector input coupled to the primary selector AND gate;
   d. a secondary transmitter selector input coupled to the secondary selector AND gate; and
   e. wherein the outgoing data line is coupled to each of the primary selector AND gate and the secondary selector AND gate.

5. The communications channel of claim 1, further comprising:
   a. an incoming data line to carry an incoming data signal for transmission over the communications channel;
   b. an incoming selector coupled to the incoming data line;
   c. an incoming primary transmitter coupled to the incoming selector;
   d. an incoming secondary transmitter coupled to the incoming selector, wherein the incoming selector is capable of selecting either the incoming primary transmitter or the incoming secondary transmitter;
   e. an incoming primary data transmission path coupled to the incoming primary transmitter;
   f. an incoming secondary data transmission path coupled to the incoming secondary transmitter;
   g. an incoming adder coupled to the incoming primary and incoming secondary data transmission paths, the incoming adder providing a sum of signals carried on the incoming primary and the incoming secondary data transmission paths;
   h. an incoming receiver coupled to the incoming adder; and
   i. an incoming data output from the incoming receiver.

6. The communications channel of claim 5, wherein each of the primary data transmission path, the secondary data transmission path, the incoming primary data transmission path, and the incoming secondary data transmission path is an optical fiber.

7. The communications channel of claim 6, wherein each of the adder and the incoming adder is an optical coupler.

8. The communications channel of claim 5, wherein the incoming selector comprises:
   a. a primary selector AND gate coupled to an input to the incoming primary transmitter;
   b. a secondary selector AND gate coupled to an input to the incoming secondary transmitter;
   c. a primary transmitter selector input coupled to the incoming primary selector AND gate;
   d. a secondary transmitter selector input coupled to the incoming secondary selector AND gate; and
   e. wherein the incoming data line is coupled to each of the incoming primary selector AND gate and the incoming secondary selector AND gate.

9. A communications channel comprising:
   a. an outgoing message line;
   b. a selector coupled to the outgoing message line;
   c. a primary transmitter coupled to the selector;
   d. a secondary transmitter coupled to the selector, the selector capable of selecting either of the primary transmitter or the secondary transmitter;
   e. a primary data path coupled to the primary transmitter;
   f. a secondary data path coupled to the secondary transmitter;
   g. a combiner connector coupled to the primary data path and the secondary data path, wherein the combiner combines the signals on the primary and secondary data lines, thereby providing a combined signal;
   h. a receiver coupled to the combiner connector to receive the combined signal; and
   i. an output from the receiver.

10. The communications channel of claim 9, wherein each of the primary and secondary data paths are optical fibers.

11. The communications channel of claim 10, wherein the combiner connector comprises:
    a. an overbored ferrule pin capable of receiving optical fibers of both the primary and secondary data paths;
    b. a connector body for receiving the ferrule pin;
    c. a photo detector in the connector body and adjacent the ferrule pin to receive a light signal from either of the primary or the secondary data paths; and
    d. a coupling to secure the ferrule pin to the connector body.

* * * * *